United States Patent

Bueb et al.

[11] 4,098,115
[45] Jul. 4, 1978

[54] YARN TENSION MEASURING DEVICE

[75] Inventors: Michael Bueb; Edgar Muschelknautz, both of Leverkusen, Germany

[73] Assignee: Bayer Aktiengesellschaft, Leverkusen, Germany

[21] Appl. No.: 649,166

[22] Filed: Jan. 14, 1976

[51] Int. Cl.² ............................................. G01L 5/04
[52] U.S. Cl. ................................................. 73/144
[58] Field of Search ................. 73/143, 144, 95.5, 160

[56] References Cited
U.S. PATENT DOCUMENTS

| | | | |
|---|---|---|---|
| 1,904,678 | 4/1933 | Ewing et al. | 73/144 |
| 2,552,189 | 5/1951 | Kuehni | 73/144 |
| 2,661,623 | 12/1953 | Brink | 73/144 |
| 2,687,885 | 8/1954 | Kroth | 73/160 |
| 3,160,357 | 12/1964 | Jackson et al. | 308/DIG. 1 |
| 3,280,623 | 10/1966 | Saxl | 73/144 |
| 3,439,536 | 5/1969 | Cushman | 73/144 |
| 3,746,233 | 7/1973 | Bauer et al. | 308/DIG. 1 |
| 3,753,517 | 8/1973 | Takenaka et al. | 308/DIG. 1 |
| 3,929,002 | 12/1975 | Stern | 73/160 |

*Primary Examiner*—Anthony V. Ciarlante
*Attorney, Agent, or Firm*—Burgess, Dinklage & Sprung

[57] ABSTRACT

Yarn tension measuring device for the measurement of small yarn tensions at high yarn speed consisting of a measuring head with three guide elements comprising air cushioned runners and having very low moments of inertia, which does not at all or only very slightly alter the yarn tension.

10 Claims, 5 Drawing Figures

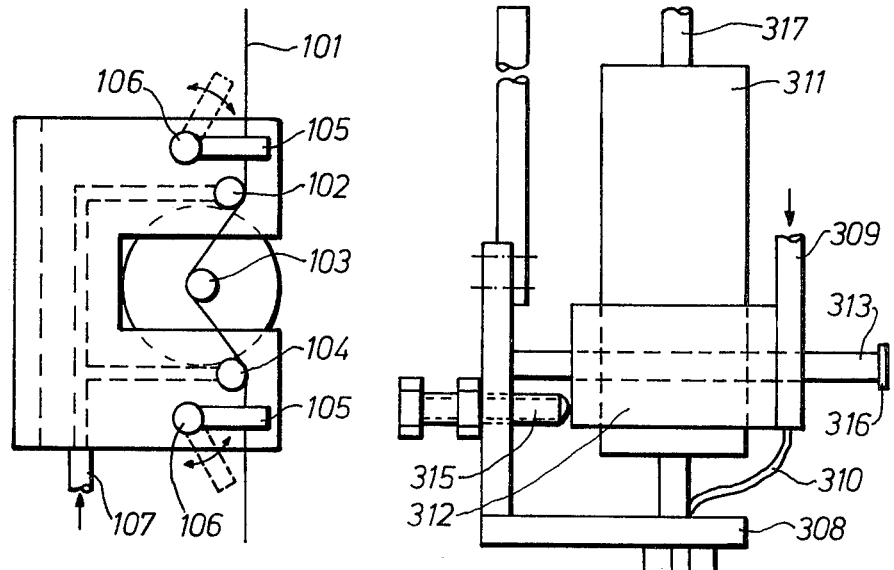
FIG. 1
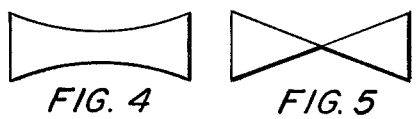
FIG. 4   FIG. 5
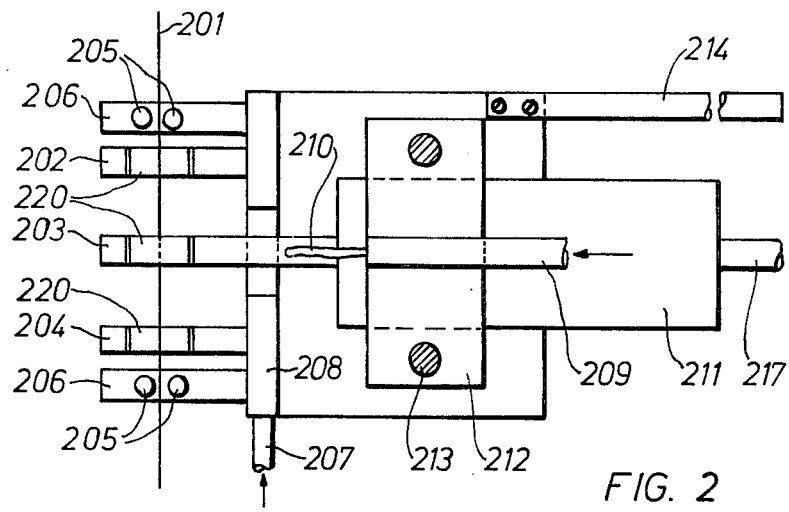
FIG. 3
FIG. 2

YARN TENSION MEASURING DEVICE

The invention relates to a yarn tension measuring device particularly suitable for the measurement of small yarn tensions at high yarn speeds, consisting of a measuring head having three guide elements.

When measuring yarn tensions in running yarns, it is necessary that the yarn tension should be not at all or only slightly increased by contact with the measurement device as a result of friction. An increase in the yarn tension by the measurement process in fact alters the quality of the yarn and can in addition in the case of particularly sensitive filamentary structures, as are for example present in very thin synthetic filaments of polyamide, polyester or elastomers, result in permanent damage. This damage for example includes stretching and in extreme cases breaks in the yarn. This damage plays a large role in the measurement of very low yarn tensions, which can occur in synthetic yarns after leaving the spinning nozzle and passing into a spinning duct or alternatively further on in the yarn path.

It is known that the yarn tension in a running yarn can be measured bypassing it for example around three guide pins. At the middle guide pin which deflects the yarn, the deflection force is measured via a mechanical spring indicator system or via an electrical system. The magnitude of this deflection force is a direct measurement for the tension acting in the yarn.

It is also known, that to fulfil the requirement for measurement with minimum friction, the guide points of known yarn tension measuring devices are provided with materials having a low coefficient of friction with respect to the yarn, for example ceramic materials.

A further known possibility for measuring the yarn tension is to provide the guide pins with guide rollers supported on ball-bearings, so as to deflect the yarn with the minimum of friction.

In spite of the use of materials with low coefficients of friction, friction forces can still occur in such measuring devices, which do not permit special yarn tension measurements. This is for example the case with yarns which have a higher coefficient of friction with respect to the guide points as a result of their high adhesive power or because of stickiness and which in addition are also very sensitive to tension.

With guide rollers supported on ball-bearings, the friction can only be reduced to the friction of the ball-bearings, which in many cases is still too high. A further disadvantage of the rollers disclosed hitherto is that as a result of the relatively large mass of the rollers in relation to the yarn mass, the moment of inertia may be such as to make the measurement of rapid changes in the yarn tension impossible.

The object of the invention is to provide a device in which friction forces exert only a very small or no influence on the yarn tension to be measured and with which sensitive yarns can be measured without permanent damage as a result of a yarn tension increase.

According to the invention there is provided a yarn tension measuring device, comprising a measuring head having three guide elements, arranged at the apexes of a triangle, in which a middle guide element is mounted on the force pick-up of an electrical dynamometer working virtually motionlessly and which is arranged in a block, wherein the guide elements comprise air cushioned runners having very low moments of inertia.

The advantages obtained with this device according to the invention are in particular that bearing friction is reduced to a minimum and the measurement of relatively rapid fluctuations in the yarn tension is made possible by the low mass of the guide elements. On account of the high sensitivity of the measuring arrangement very low yarn tensions, of less than 1 pond, can be measured in thin and sensitive yarns, without influencing the yarn tension or the yarn tension fluctuations by the measuring device, for example by an increase in tension as a result of friction forces or the inertia of rotating masses.

According to one embodiment of the device according to the invention the air for the cushioned bearing is fed to the force measuring guide element via a flexible hose. The efect of this is that the device can be displaced spatially without having to install new air lines.

To further reduce the mass of the guide element according to a further embodiment of the device according to the invention, the air is fed through a feed channel in the interior of the guide element. According to a further embodiment of the device according to the invention the surfaces of the runners have a low coefficient of friction. The effect of this is in particular that the yarn tension or fluctuations in the yarn tension are not influenced or are influenced only to a very small extent by the measuring device.

According to further embodiments of the device according to the invention, to guide the yarn on the runners, the generatrix of the runners is cylindrical or curved inwards; it can also consist of two abutting truncated cone generatrices.

According to a further embodiment of the device according to the invention, a yarn guide is used to guide the yarn onto the runners.

To adapt the measurement zone to the particular yarn to be measured, according to a further embodiment of the device according to the invention, the force measuring guide element is arranged on an adjustable mounting.

An embodiment of the device according to the invention is illustrated in the drawing and is further described below.

FIG. 1 shows a front view of an embodiment of the device according to the invention.

FIG. 2 shows a side view of the device shown in FIG. 1.

FIG. 3 shows a plan view of the device shown in FIG. 1.

FIG. 4 and FIG. 5 show, respectively, a runner having a generatrix which is curved inwardly, and a runner enclosing a space consisting of two abutting cones.

FIG. 1 shows schematically a front view of an embodiment of the device according to the invention. A yarn 101 runs over guide elements 102, 103 and 104, which are provided with air cushioned runners. They deflect the yarn and form a so-called yarn triangle. By the lateral adjustment of the middle guide element 103, the yarn 101 is laterally deflected. The deflection force is measured at the middle guide element 103. The yarn guides 105 provide for the lateral guiding of the thread 101; they can be pivoted about the pins 106. Compressed air for the support of the guide elements 102, 103, 104 is supplied via feed pipe 107.

FIG. 2 shows a side view of the embodiment of the device according to the invention. The guide elements 202, 203, 204 are each provided with air cushioned runners 220. The yarn 201 runs over them. The air is fed to the air bearings of the guide elements 202 and 204 via the feed pipe, 207 and supply bores within the plate 208. The air to the air bearing of the guide element 203 is fed via the feed pipe 209 and a thin flexible hose 210. The guide element 203 forms the force pick up pin of an electrical dynamometer which is provided in a housing 211. The air supply via the hose 210 only has a negligible effect of the force measured since the measurement takes place virtually motionlessly. Before beginning the measurements, the electrical compensation of the zero point is fixed. The housing 211 is located in a block 212, which is arranged so as to be displaceable on guide bars 213. By this arrangement the middle guide element 203 or the housing 211 can be moved laterally. A mounting bar 214 is fitted to hold the measurement arrangement at the measurement point. The electrical measurement signal is transmitted by a cable 217.

FIG. 3 shows the plan view of the embodiment of the device according to the invention. In the event of a lateral movement of the middle guide element an adjustable stop screw 315 ensures that the same deflection of the yarn is always achieved. A stop 316 at the end of the guide bars 313 prevents the block 312 from sliding out of the guide. The electrical measurement value is passed on for further processing via the cable 317. The yarn tension measuring device described in this example permits yarn tension measurements under 1 pond. The yarn speeds in most instances lie between 400 and 4,000 m/min. Given a runner radius of 2 mm the revolutions can reach 300,000 rpm. The radial bearing play, i.e. the radius difference between the runner and the guide element in which it is mounted, may be between 10 and 50 μm. Larger bearing plays result in a higher air consumption, and the yarn tension measurement could be disturbed by the air exiting laterally from the bearings. The low moment of inertia of the runner is conditioned by the dimensions of the runner: for a length of 8 mm the wall thickness is only 0.5 mm; it is manufactured from aluminium and weighs only 0.2 g.

What we claim is:

1. A yarn tension measuring device, comprising a measuring head having three guide elements and means for enabling a Sommerfield number of $\leq 0.5$ for yarn travelling at a speed of from 400 – 400 m/min comprising mounting the guide elements for rotation up to 300,000 r.p.m. with the axes of rotation at the apexes of a triangle, in which a middle guide element is mounted on the force pick-up of an electrical dynamometer working virtually motionlessly and which is arranged in a block, wherein the guide elements comprise air cushioned runners having very low moments of inertia.

2. A device according to claim 1, wherein the middle guide element is provided with a flexible hose for its air supply.

3. A device according to claim 1, wherein the middle guide element is provided in its interior with a feed channel for the air supply.

4. A device according to claim 1, wherein the surfaces of the runners have a low coefficient of friction.

5. A device according to claim 1, wherein the runners have a cylindrical surface.

6. A device according to claim 1, wherein the generatrix of the runners is curved inwards.

7. A device according to claim 1, wherein the runners enclose a space consisting of two abutting truncated cones.

8. A device according to claim 1, further comprising yarn guides for guiding the yarn onto the air cushioned runners.

9. A device according to claim 1, wherein the radius of the guide element is in a range around 2 mm for a radial bearing play of between 10 and 50 μm.

10. A device according to claim 9, wherein the radius of the guide elements is 2 mm.

* * * * *

UNITED STATES PATENT AND TRADEMARK OFFICE
CERTIFICATE OF CORRECTION

PATENT NO. : 4,098,115
DATED : July 4, 1978
INVENTOR(S) : Michael Bueb et al

It is certified that error appears in the above-identified patent and that said Letters Patent are hereby corrected as shown below:

Col. 4, line 7    Delete "400 - 400 m/min" and substitute --400 - 4000 m/min--.

Signed and Sealed this

Fifteenth Day of May 1979

[SEAL]

Attest:

RUTH C. MASON
Attesting Officer

DONALD W. BANNER
Commissioner of Patents and Trademarks